US010638371B2

(12) United States Patent
Zhang et al.

(10) Patent No.: US 10,638,371 B2
(45) Date of Patent: Apr. 28, 2020

(54) UNIVERSAL RESERVATION SIGNAL FOR MEDIUM SHARING

(71) Applicant: QUALCOMM Incorporated, San Diego, CA (US)

(72) Inventors: Xiaoxia Zhang, San Diego, CA (US); Bin Tian, San Diego, CA (US); Jing Sun, San Diego, CA (US); Taesang Yoo, San Diego, CA (US); Aleksandar Damnjanovic, Del Mar, CA (US); Tamer Kadous, San Diego, CA (US); Yongbin Wei, La Jolla, CA (US); Hemanth Sampath, San Diego, CA (US); Sameer Vermani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/960,883

(22) Filed: Apr. 24, 2018

(65) Prior Publication Data
US 2019/0014507 A1 Jan. 10, 2019

Related U.S. Application Data

(60) Provisional application No. 62/529,074, filed on Jul. 6, 2017.

(51) Int. Cl.
H04W 72/04 (2009.01)
H04W 16/02 (2009.01)
(Continued)

(52) U.S. Cl.
CPC ......... *H04W 28/26* (2013.01); *H04L 27/2613* (2013.01); *H04W 16/14* (2013.01); *H04W 74/0816* (2013.01)

(58) Field of Classification Search
None
See application file for complete search history.

(56) References Cited

U.S. PATENT DOCUMENTS

2015/0230255 A1* 8/2015 Lopes ............... H04W 16/02
370/329
2016/0066198 A1* 3/2016 Wang ............... H04W 16/28
370/338
(Continued)

FOREIGN PATENT DOCUMENTS

| WO | WO-2016073662 A1 | 5/2016 |
| WO | WO-2016141368 A1 | 9/2016 |
| WO | WO-2018064000 A1 | 4/2018 |

OTHER PUBLICATIONS

International Search Report and Written Opinion—PCT/US2018/029410—ISA/EPO—dated Jul. 20, 2018.

*Primary Examiner* — Gary Lafontant
(74) *Attorney, Agent, or Firm* — Liem T. Do

(57) ABSTRACT

Wireless communications systems and methods related to signaling medium reservation information medium sharing among multiple radio technologies (RATs) are provided. A first wireless communication device communicates, with a second wireless communication device, a reservation signal to reserve a transmission opportunity (TXOP) in a spectrum. The spectrum is shared by multiple RATs. The reservation signal includes a plurality of first waveform sequences indicating medium reservation information detectable by the multiple RATs. The first wireless communication device and the second wireless communication device are associated with a first RAT of the multiple RATs. The first wireless communication device communicates, with the second wireless communication device using the first RAT, a communication signal in the spectrum during the TXOP.

27 Claims, 11 Drawing Sheets

(51) Int. Cl.
    *H04W 28/26*     (2009.01)
    *H04W 16/14*     (2009.01)
    *H04L 27/26*     (2006.01)
    *H04W 74/08*     (2009.01)

(56) References Cited

U.S. PATENT DOCUMENTS

| | | |
|---|---|---|
| 2016/0248555 A1 | 8/2016 | Lei et al. |
| 2016/0295420 A1 | 10/2016 | Luo et al. |
| 2017/0230213 A1* | 8/2017 | Wang .................... H04L 5/0007 |
| 2018/0302868 A1* | 10/2018 | Bhorkar ............ H04W 56/0005 |

\* cited by examiner

UNIVERSAL RESERVATION SIGNAL FOR MEDIUM SHARING

CROSS REFERENCE TO RELATED APPLICATIONS

The present application claims priority to and the benefit of the U.S. Provisional Patent Application No. 62/529,074, filed Jul. 6, 2017, which is hereby incorporated by reference in its entirety as if fully set forth below and for all applicable purposes.

TECHNICAL FIELD

This application relates to wireless communication systems and methods, and more particularly to signaling medium reservation information for medium sharing among multiple radio access technologies (RATs).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies o are advancing from the LTE technology to a next generation new radio (NR) technology. NR may provision for dynamic medium sharing among network operators and different RATs in a licensed spectrum, a shared spectrum, and/or an unlicensed spectrum. For example, NR and Institute of Electrical and Electronics Engineers (IEEE) 802.11 (WiFi) technologies may be deployed over the same spectrum.

An approach to sharing a communication medium or spectrum among multiple RATs is to employ a listen-before-talk (LBT) procedure to ensure a particular channel is clear before transmitting a message. For example, a transmitting node may listen to the channel to determine whether there are active transmissions in the channel based on energy detection. While energy detection may have low computational complexity, energy detection-based LBT may provide limited system performance, for example, missed detection and/or false detection. A missed detection may lead to collision and a false detection may cause resource (e.g., spectrum) to be underutilized.

To improve the performance, channel listening may include the detection of a specific sequence. For example, another transmitting node may transmit a specific preamble sequence to indicate use of the channel prior to transmitting data in the channel. However, different RATs may use different numerologies (e.g., subcarrier spacing). For example, NR subcarrier spacing may not an integer multiple of WiFi subcarrier spacing. As such, the detection of a preamble transmitted by a different RAT may require resampling, and thus may be computationally complex. Accordingly, improved procedures for signaling medium reservation information across multiple RATs are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a reservation signal to reserve a transmission opportunity (TXOP) in a spectrum, wherein the spectrum is shared by multiple radio access technologies (RATs), wherein the reservation signal includes a plurality of first waveform sequences indicating medium reservation information detectable by the multiple RATs, and wherein the first wireless communication device and the second wireless communication device are associated with a first RAT of the multiple RATs; and communicating, by the first wireless communication device with the second wireless communication device using the first RAT, a communication signal in the spectrum during the TXOP.

In an additional aspect of the disclosure, an apparatus includes a transceiver configured to communicate, with a second wireless communication device, a reservation signal to reserve a transmission opportunity (TXOP) in a spectrum, wherein the spectrum is shared by multiple radio access technologies (RATs), wherein the reservation signal includes a plurality of first waveform sequences indicating medium reservation information detectable by the multiple RATs, and wherein the apparatus and the second wireless communication device are associated with a first RAT of the multiple RATs; and communicate, with the second wireless communication device using the first RAT, a communication signal in the spectrum during the TXOP.

In an additional aspect of the disclosure, a non-transitory computer-readable medium having program code recorded thereon, the program code includes code for causing a first wireless communication device to communicate, with a second wireless communication device, a reservation signal to reserve a transmission opportunity (TXOP) in a spectrum, wherein the spectrum is shared by multiple radio access technologies (RATs), wherein the reservation signal includes a plurality of first waveform sequences indicating medium reservation information detectable by the multiple RATs, and wherein the first wireless communication device and the second wireless communication device are associated with a first RAT of the multiple RATs; and code for causing the first wireless communication device to communicating, by the first wireless communication device with the second wireless communication device using the first RAT, a communication signal in the spectrum during the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
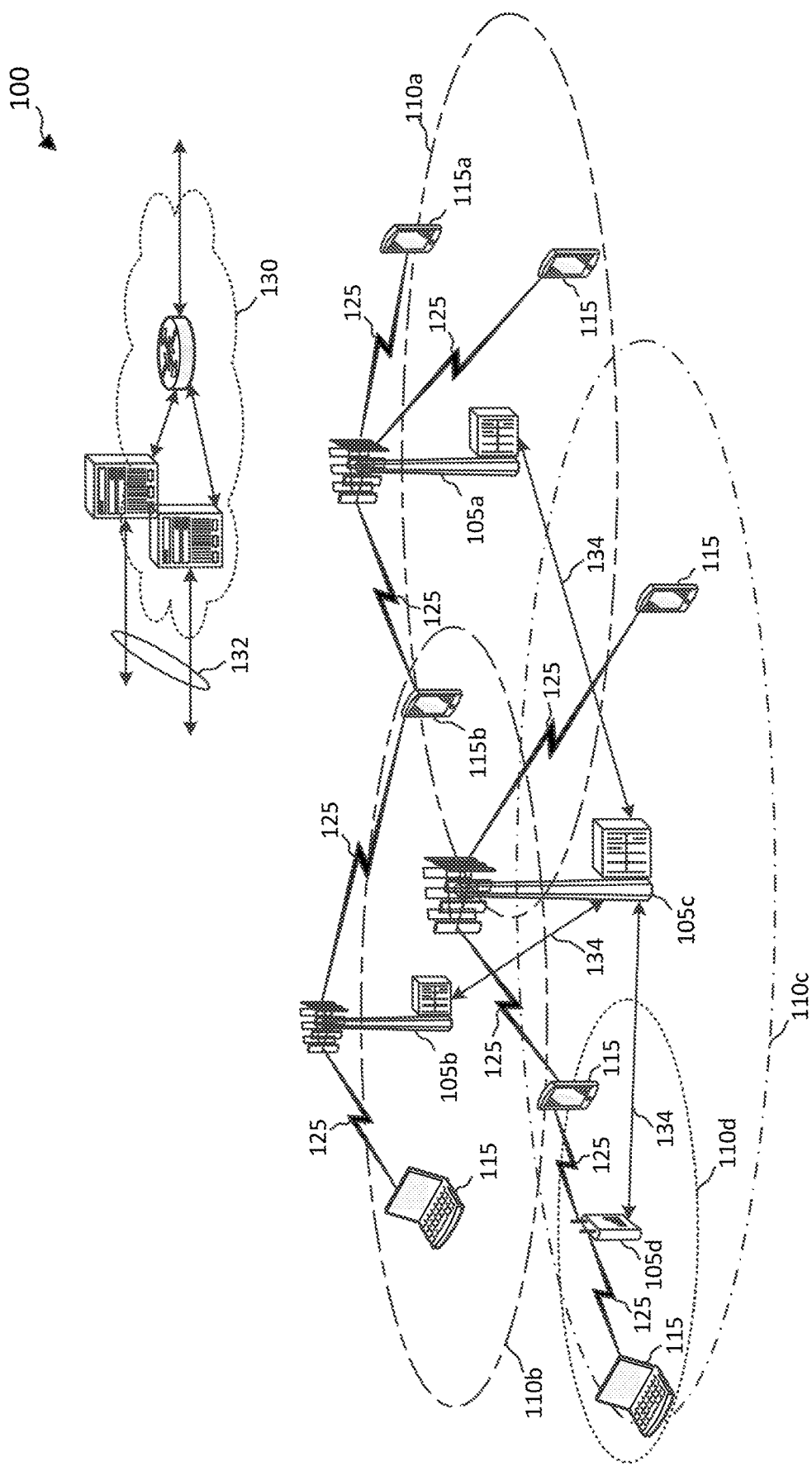
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present application describes mechanisms for signaling medium reservation information for medium sharing among multiple RATs. The disclosed embodiments employ a waveform-based universal reservation signal (URS) to indicate medium reservation information detectable by multiple RATs. The URS may include a plurality of waveform sequences. Each waveform sequence may correspond to an instance of a waveform sequence masked according to the medium reservation information. The medium reservation information may include a minimal amount of information sufficient for RAT-level medium sharing. For example, the medium reservation information may indicate a transmission opportunity (TXOP) duration and the RAT that is reserving the TXOP. The medium reservation information for medium sharing within a RAT may be carried in a separate reservation signal.

In an embodiment, the URS may include an additional short training field (STF) at the beginning of the URS prior to the waveform sequences carrying the medium reservation information. The STF may include a plurality of waveform sequence (e.g., repetitions of a waveform sequence) for synchronization and training at a receiver.

In an embodiment, different RATs may use different numerologies. For example, a transmitter of a particular RAT may transmit URSs using the numerology of the particular RAT and a receiver of a different RAT may adjust sample spacing during URS detection and processing. Alternatively, a transmitter may transmit multiple URSs, each using a different RAT and carrying the same medium reservation information.

Aspects of the present application can provide several benefits. For example, the use of waveform-based URSs enables a receiver to recover the transmitted medium reservation information based on waveform detection instead of data decoding. Data decoding may require resampling when a transmitting RAT is different from a receiving RAT. Thus, waveform detection may have a lower computational complexity than data decoding. The use of a repeating waveform sequence enables a receiver to detect the presence of a URS and/or recover the medium reservation information based on autocorrelations and/or cross-correlations, which may have a low computational complexity. The use of separate reservation signals for medium sharing within a RAT and medium sharing across RATs can reduce signaling overhead and complexity for the design of the RAT-level URSs. For example, reducing the amount of medium reservation information can reduce the number of URS waveforms. The use of URSs to communicate medium reservation information detectable by all RATs sharing a spectrum can improve overall system performance. While the disclosed embodiments may be described in the context of NR-based technology and WiFi-based technology, the disclosed embodiments are suitable for use in any wireless communication network with any type of RAT and any number of RATs.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-F-DM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In an embodiment, the network 100 may operate over a shared channel, which may include a licensed spectrum, a shared spectrum, and/or an unlicensed spectrum, and may support dynamic medium sharing. In addition, the network 100 may include multiple RATs. For example, some BSs 105 and/or UEs 115 may communicate over a spectrum using NR-based technology, while other BSs 105 and/or other UEs 115 may share the same spectrum for communications using WiFi-based technology. Mechanisms for medium sharing across multiple RATs are described in greater detail herein.

Figure 2:
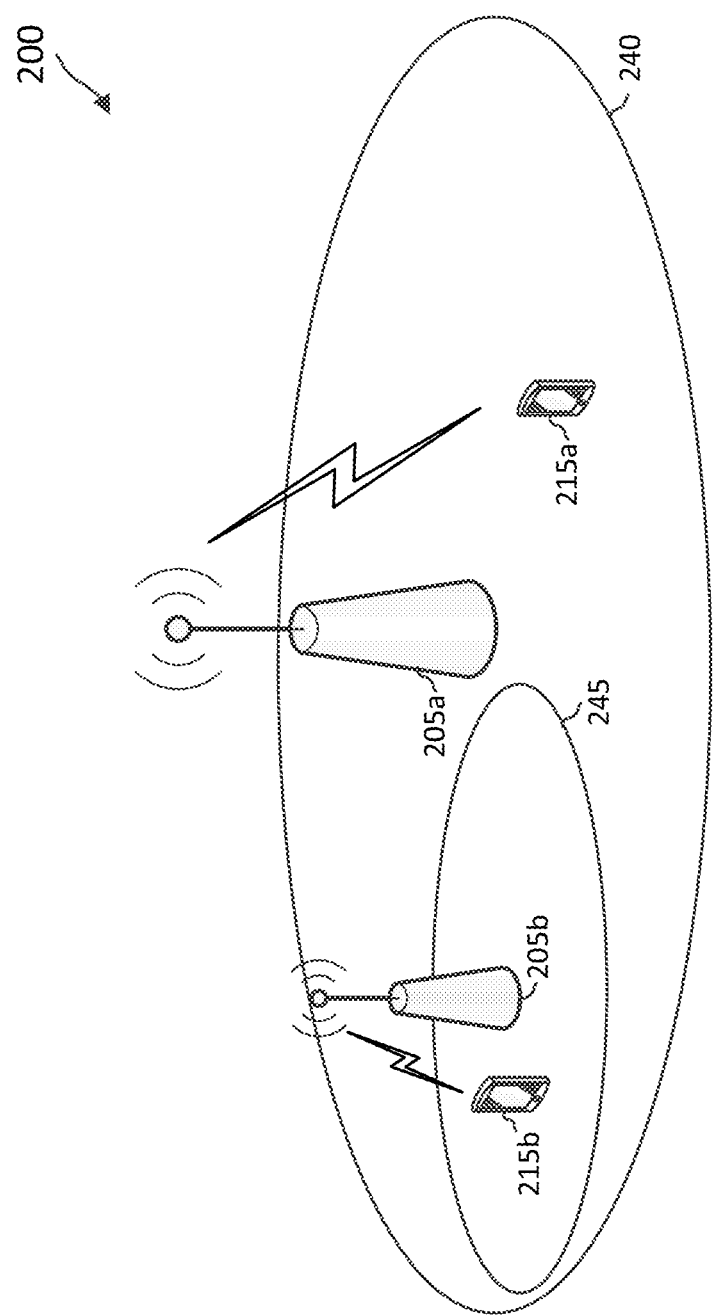
FIG. 2 illustrates an example of a wireless communications network that supports medium sharing across multiple radio access technologies (RATs) according to embodiments of the present disclosure.

FIG. 2 illustrates an example of a wireless communications network 200 that supports medium sharing across multiple RATs according to embodiments of the present disclosure. The network 200 may be similar to the network 100. FIG. 2 illustrates two BSs 205 and two UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively.

In the network 200, the BS 205a serves the UE 215a in a serving cell or a coverage area 240 using a first RAT, while the BS 205b serves the UE 215b in a serving cell or a coverage area 245 using a second RAT. The first RAT and the second RAT may be different RATs. For example, the first RAT may be an NR-based technology and the second RAT may be a WiFi-based technology. The BSs 205 and the UEs 215 of different RATs may communicate over the same spectrum in the using an LBT procedure. For example, the different RATs may be deployed over an unlicensed frequency band, for example, in the 6 gigahertz (GHz) frequency band with a bandwidth of about 500 megahertz (MHz).

To perform LBT, the BS 205a may listen to the channel. When the channel is clear, the BS 205a may transmit a reservation signal to reserve a TXOP in the spectrum. The reservation signal can silence nodes (e.g., the BS 205b and/or other UE 215b) of the other RAT. Subsequently, the BS 205a may communicate with the UE 215a in the spectrum during the reserved TXOP.

To enable a node of a particular RAT to detect a reservation signal transmitted by a different RAT, the network 200 may employ a URS that is detectable by all RATs in the network 200.

To minimize the detection complexity across different RATs, the network 200 may employ waveform-based URSs. For example, the network 200 may employ different waveforms to represent different medium reservation information. In addition, the network 200 may employ a repeating short-period waveform sequence and apply different mask patterns to the waveform sequences to represent different medium reservation information. Thus, the BS 205b and the UE 215b may determine medium reservation information from a URS transmitted by the BS 205a or the UE 215a based on waveform detection instead of data decoding. In addition, the waveform-based URSs can allow for a larger frequency and/or timing offset than content-based URSs. For example, an NR node may have a higher timing and/or frequency accuracies than a WiFi node.

To reduce the number of waveform sequences, the network 200 may include a minimum amount of medium reservation information in the URSs. For example, a URS may include information such as a reserved TXOP duration and the RAT reserving the TXOP. Preamble sequences, scheduling information, and/or other reservation information specific to the operations of the reserving RAT may be carried in a separate reservation signal for sharing among nodes of the reserving RAT. For example, the network 200 may include other BSs and/or UEs for the first RAT. The BS 205a may transmit a separate reservation signal indicating scheduling information for the UE 215a to silence other BSs and/or UEs of the first RAT after transmitting a URS. The use of a smaller number of waveform sequences reduces the length or the time span of a URS. The shorter URS length can lower collision rate.

Different RATs may use different numerologies (e.g., different subcarrier spacing and different sampling rates). In an embodiment, a transmitting node of a particular RAT may transmit a URS using the numerology of the particular RAT and a monitoring or detecting node of another RAT may account for the different numerologies during URS detection. For example, a detecting node may perform the detection using autocorrelation and/or cross-correlation and may account for different numerologies by adjusting sample block spacing during correlations.

In another embodiment, a transmitting node of a particular RAT may transmit multiple URSs, each with a different numerology, but carrying the same medium reservation information. The multiple URSs allow a detecting node of a particular RAT to perform URS detection based on the numerology of the particular RAT. For example, the BS 205a may transmit a first URS using a numerology of the first RAT and a second URS using a numerology of the second RAT. The BS 205b and/or the UE 215b may detect a reservation from the BS 205a based on the second URS using the numerology of the second RAT. Mechanisms for sharing a medium across different RATs are described in greater detail herein.

Figure 3:
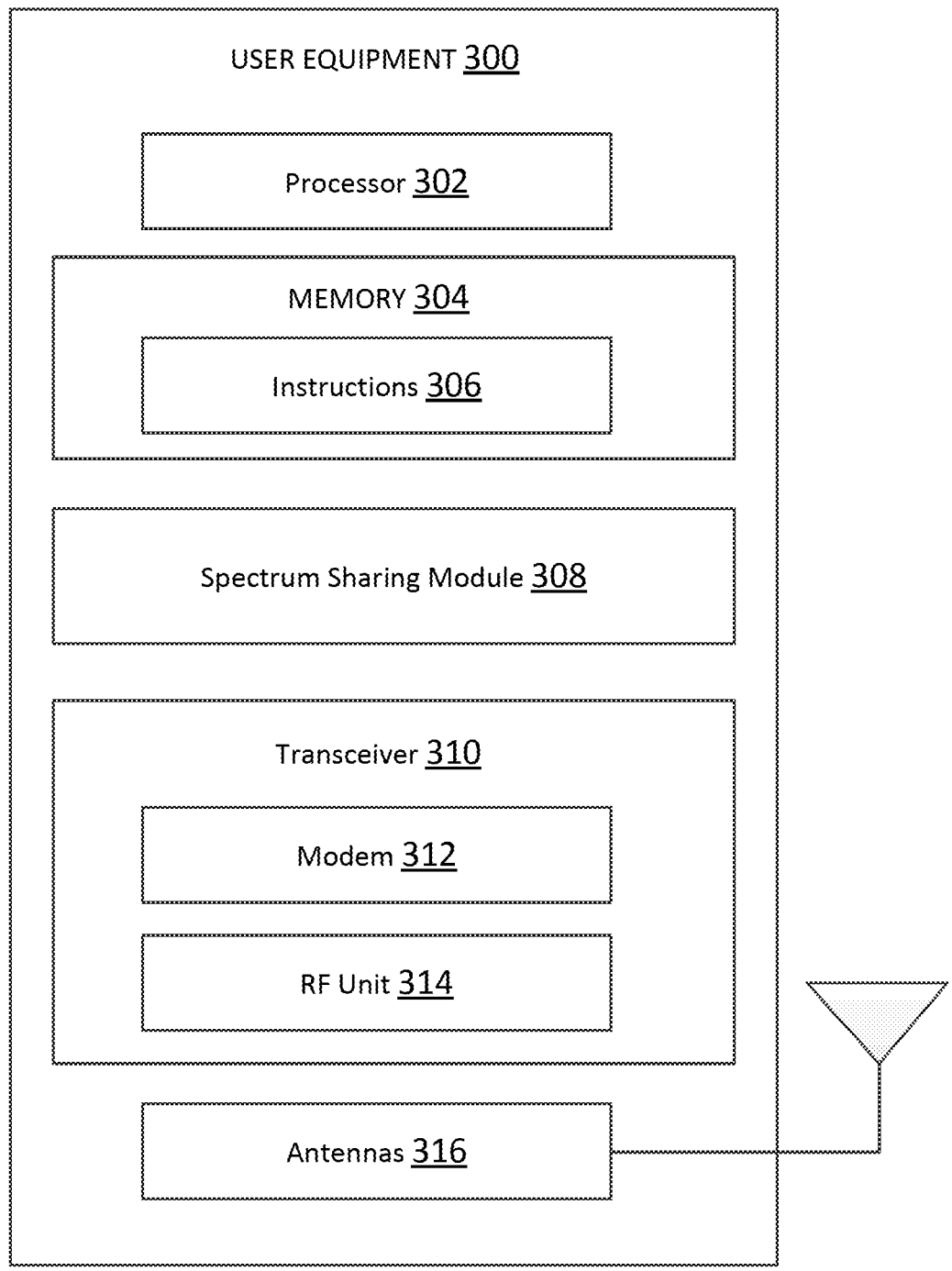
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 115 or 215 as discussed above. As shown, the UE 300 may include a processor 302, a memory 304, a spectrum sharing module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 215 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The spectrum sharing module 308 may be used for various aspects of the present disclosure. For example, the spectrum sharing module 308 is configured to monitor for URSs transmitted by multiple RATs, determine medium reservation information from the detected URSs, generate and transmit URSs using numerologies of one or more RATs, and/or perform LBT, as described in greater detail herein.

As shown, the transceiver 310 may include the modem subsystem 312 and the RF unit 314. The transceiver 310 can be configured to communicate bi-directionally with other devices, such as the BSs 105 and 205. The modem subsystem 312 may be configured to modulate and/or encode the data from the memory 304, and/or the spectrum sharing module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or 215 or a BS 105 or 205. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 215 to enable the UE 215 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of URSs according to embodiments of the present disclosure. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

Figure 4:
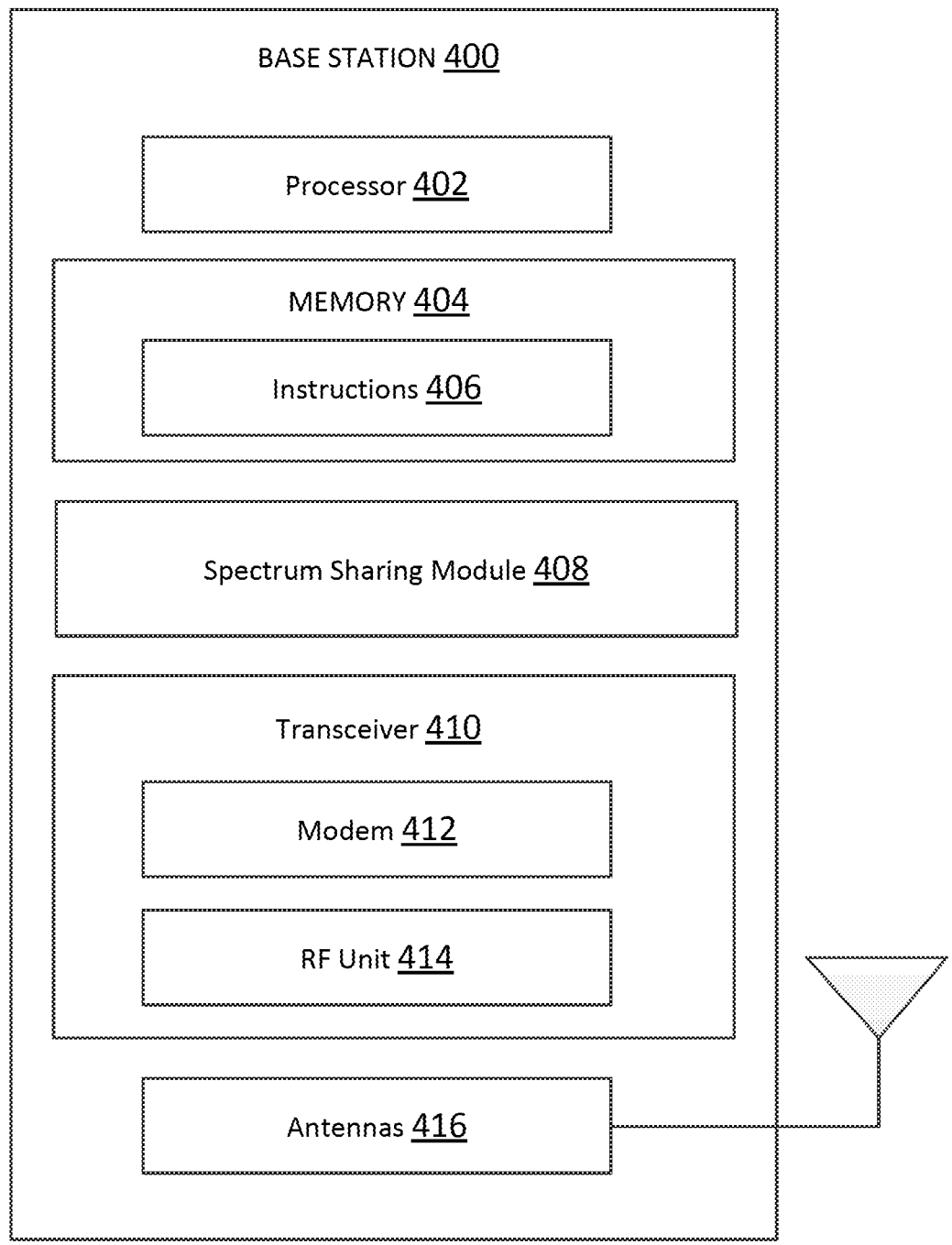
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 or 205 as discussed above. A shown, the BS 400 may include a processor 402, a memory 404, a spectrum sharing module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 4.

The spectrum sharing module 408 may be used for various aspects of the present disclosure. For example, the spectrum sharing module 308 is configured to monitor for URSs transmitted by multiple RATs, determine medium reservation information from the detected URSs, generate and transmit URSs using numerologies of one or more RATs, and/or perform LBT, as described in greater detail herein.

As shown, the transceiver 410 may include the modem subsystem 412 and the RF unit 414. The transceiver 410 can be configured to communicate bi-directionally with other devices, such as the UEs 115 and 215 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115, 215, or 300. The RF unit 414 may be further configured to perform analog beamforming in conjunction with the digital beamforming. Although shown as integrated together in transceiver 410, the modem subsystem 412 and the RF unit 414 may be separate devices that are coupled together at the BS 105 or 205 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115, 215, or 300 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

Figure 5:
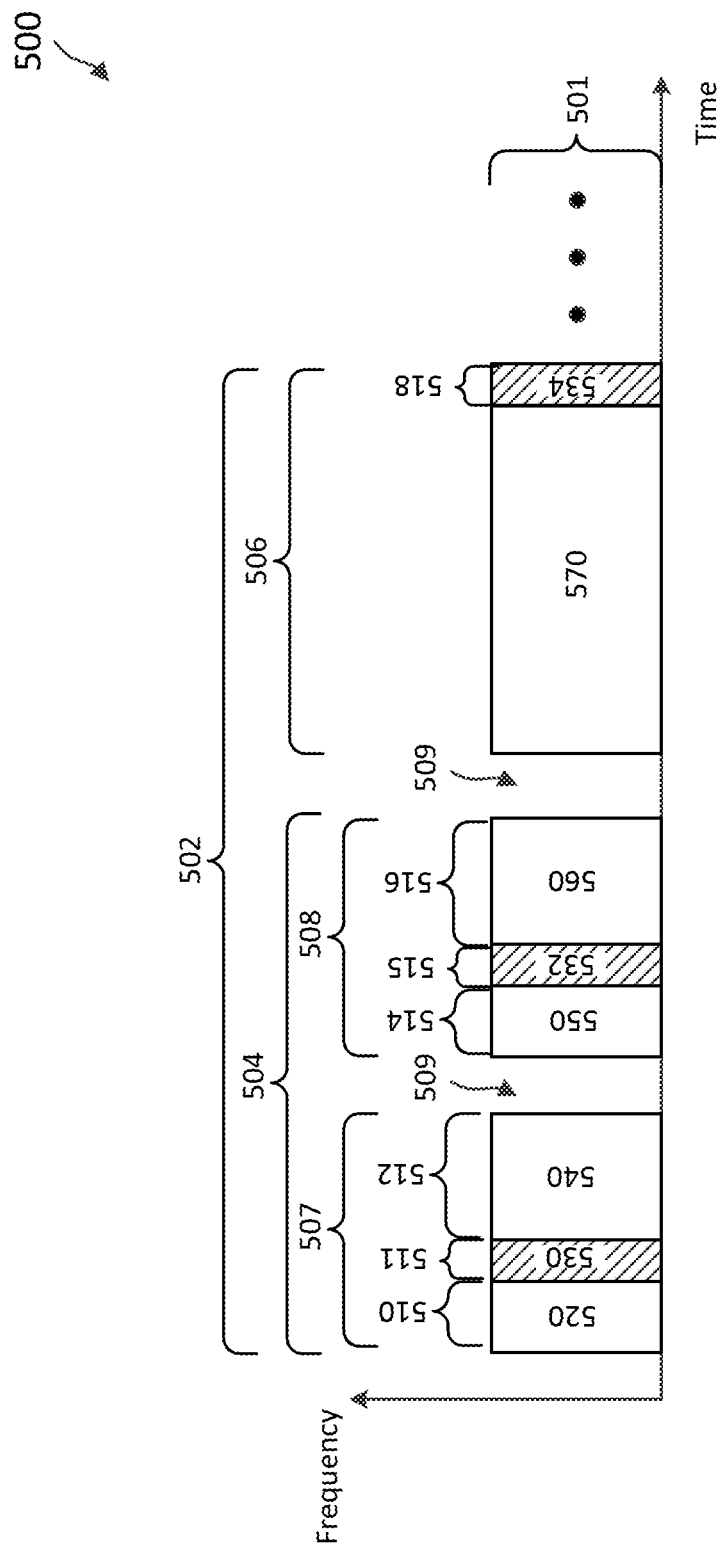
FIG. 5 illustrates multi-RAT medium sharing scheme according to embodiments of the present disclosure.

FIG. 5 illustrates a multi-RAT medium sharing scheme 500 according to embodiments of the present disclosure. The x-axis represents time in some constant units. The y-axis represents frequency in some constant units. The scheme 500 may be employed by nodes or devices of different RATs, such as the BSs 105, 205, and 400 and the UEs 115, 215, and 300, to communicate over a shared spectrum 501.

In the scheme 500, communications in the spectrum 501 may be in units of TXOP 502. A TXOP 502 may include a channel sensing period 504 followed by a transmission period 506. The channel sensing period 504 may include an RRQ period 507 and an RRS period 508. The RRQ period 507 may include a common period 510, a filler period 511, and a RAT-specific period 512. Similarly, the RRS period 508 may include a common period 514, a filler period 515, and a RAT-specific period 516. The RRQ period 507, the RRS period 508, and the transmission period 506 are spaced apart by gap periods 509. The gap periods 509 allow time for processing at a receiver and/or switching between a transmit mode and a receive mode at a transmitter and/or at a receiver.

As an example, a transmitting node (e.g., the BSs 205 and the UEs 215) using a particular RAT may transmit a URS 520 in the common period 510 of the RRQ period 507 to reserve the TXOP 502. The URS 520 may indicate medium reservation information. For example, the medium reservation information may include a duration of the TXOP 502 and the RAT used by the transmitter to transmit the URS 520. The URS 520 may be a waveform-based signal and may represent reservation information using different waveforms, as described in greater detail herein.

A node of another RAT contending for the channel may monitor the spectrum 501 for a URS 520. For example, upon detection of a URS 520, the node may refrain from communicating in the spectrum 501. As such, the transmission of the URS 520 may silence nodes of other RATs for medium sharing across different RATs.

After transmitting the URS 520, the transmitting node may transmit a RAT-specific RRQ signal 540 in the RAT-specific period 512 of the RRQ period 507. The RAT-specific RRQ signal 540 may include a preamble, a request-to-send (RTS) signal, scheduling information for a target receiving node of the particular RAT, interference management related parameters, and/or spatial LBT information, which may require a receiver to perform content or data decoding. Nodes of the particular RAT may monitor the spectrum 501 and refrain from communicating in the spectrum 501 upon detection of the RAT-specific RRQ signal 540. Thus, the transmission of the RAT-specific RRQ signal 540 may silence other nodes of the particular RAT for medium sharing within the particular RAT.

In an embodiment, when a monitoring node of a particular RAT detected a URS 520 transmitted by a node of a different RAT, the monitoring node may not proceed to receive and process the RAT-specific RRQ signal 540. Conversely, when a monitoring node of a particular RAT detected a URS 520 transmitted by another node of the same RAT, the monitoring node may proceed to receive, process, and decode the content of the RAT-specific RRQ signal 540.

In response to the URS 520, the target receiving node may transmit a URS 550 in the common period 514 of the RRS period 508. The URS 550 may be substantially similar to the URS 520 and may indicate substantially similar medium reservation information as the URS 520. In addition, the target receiving node may respond to the RAT-specific RRQ signal 540 by transmitting a RAT-specific RRS signal 560 in the RAT-specific period 516 of the RRS period 508. The RAT-specific RRS signal 560 may include a preamble and/or a clear-to-send (CTS) signal. Similar to the processing of the RAT-specific RRQ signal 540, a monitoring node may not proceed to receive and process the RAT-specific RRS signal 560 when detecting a URS 550 transmitted by a different RAT.

Subsequently, the transmitting node may transmit a communication signal 570 to the target receiving node during the transmission period 506. In some embodiments, the inclusion of the RRS period 508 in the transmission period 506 and the transmissions of the URS 550 and/or the RAT-specific RRS signal 560 may be optional.

In the scheme 500, the TXOP 502 may have a variable duration dependent on the length of the communication signal 570. In an embodiment, the timing of the TXOP 502 may be asynchronous to the timing of a serving cell of the transmitting node. Thus, the TXOP 502 may or may not align to a symbol boundary of the serving cell. The URSs 520 and 550 may have a fixed duration, but may or may not align to the symbol time of the serving cell. Thus, the URSs 520 and 550 may or may not end at a symbol boundary of the serving cell.

In order to allow the RAT-specific RRQ signal 540 and the RAT-specific RRS signal 560 to align to a symbol boundary of the serving cell, the transmitting node may transmit a filler signal 530 during the filler period 511 and the receiving node may transmit a filler signal 532 during the filler period 515, respectively, to align to a next symbol boundary. In an embodiment, the filler signal 530 may be transmitted as an extension to the URS 520. In another embodiment, the filler signal 530 may be transmitted as an extended cyclic prefix (CP) of the RAT-specific RRQ signal 540. Similarly, the receiving node may transmit the filler signal 532 as an extension to the URS 550 or as an extended CP of the RAT-specific RRS signal 560.

In an embodiment, the TXOP 502 may be reserved in some predetermined units of time or granularities, for example, in units of 10 microseconds (μs) or 1 millisecond (ms). Thus, the communication signal 570 may or may not end at the end of the TXOP 502. When the communication signal 570 does not span the entire transmission period 506, the transmitting node may transmit a filler signal 534 after the communication signal 570 to fill the filler period 518. The filler signals 530, 532, and 534 may carry filler data, which may be dropped or ignored at a receiver.

Figure 6:
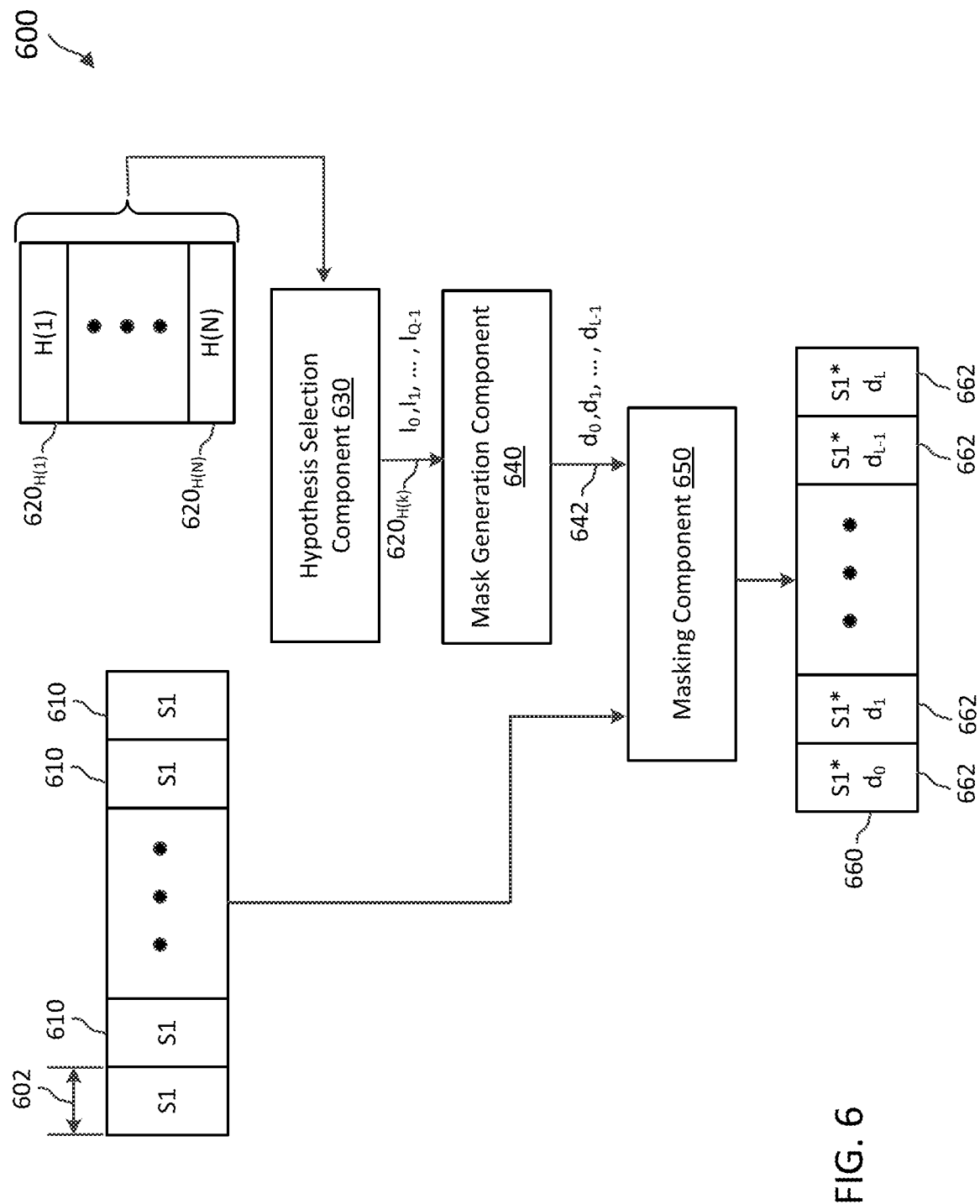
FIG. 6 illustrates a universal reservation signal (URS) generation scheme for multi-RAT medium sharing according to embodiments of the present disclosure.
Figure 7:
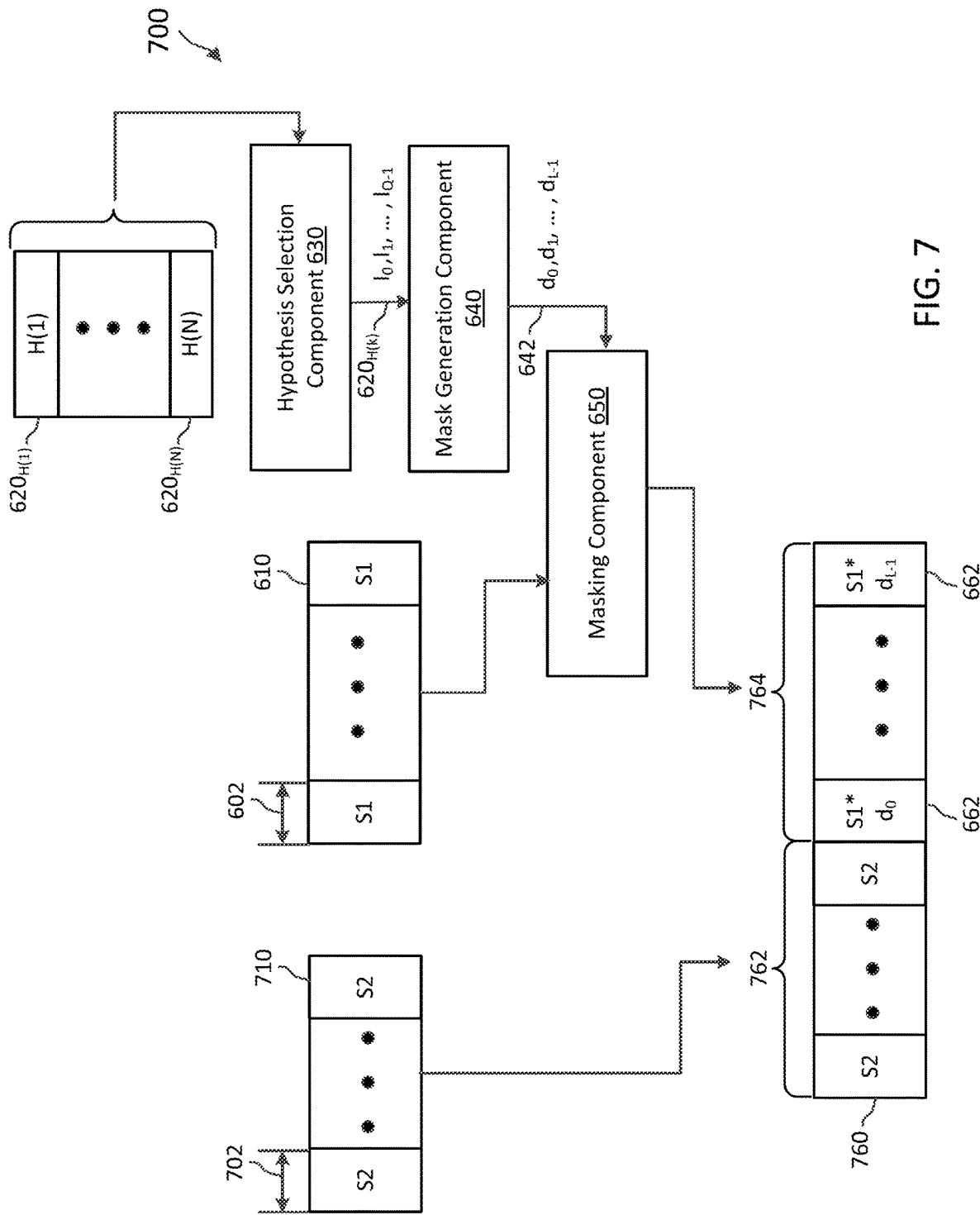
FIG. 7 illustrates a URS generation scheme for multi-RAT medium sharing according to embodiments of the present disclosure.
Figure 8:
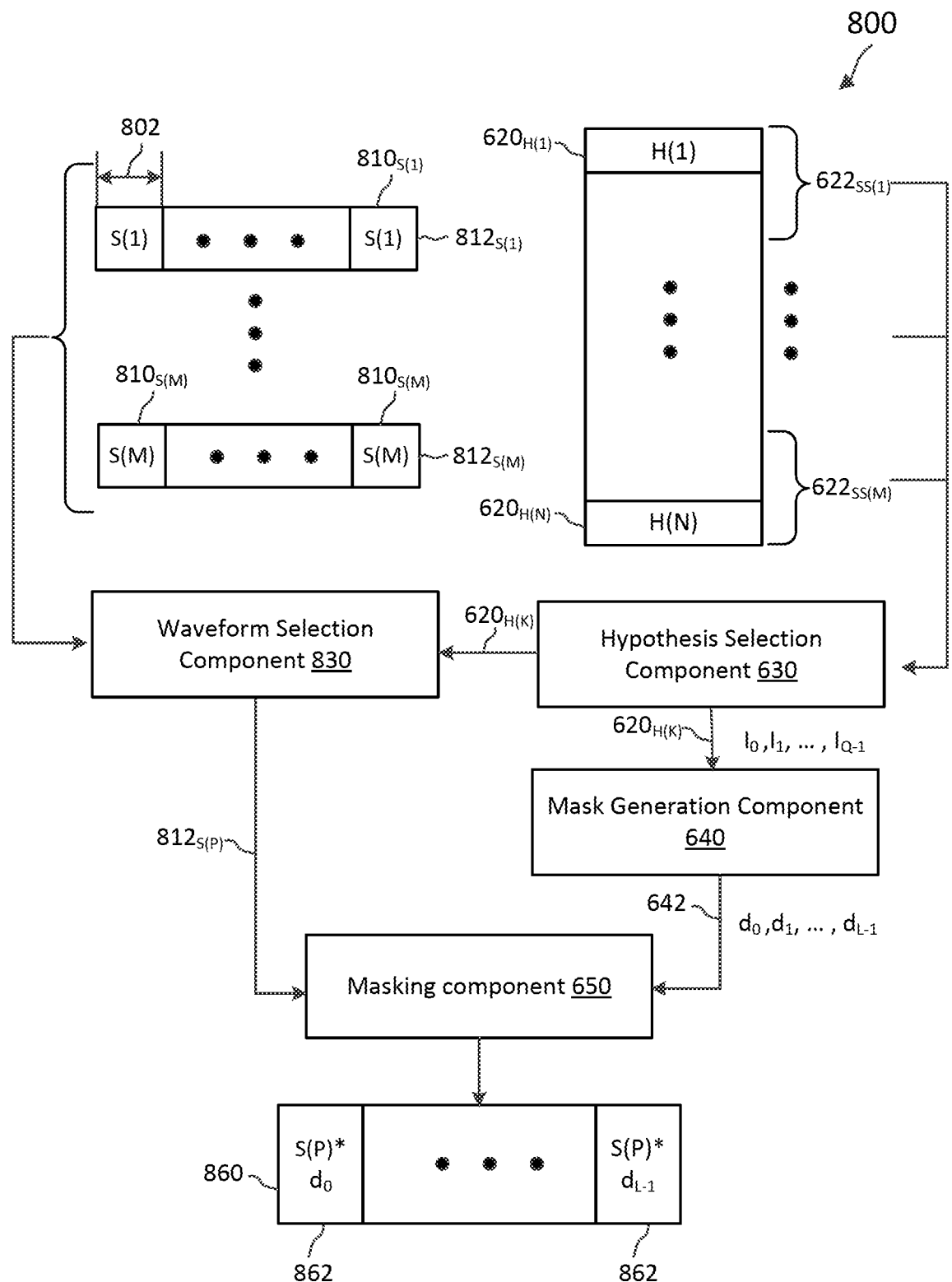
FIG. 8 illustrates a URS generation scheme for multi-RAT medium sharing according to embodiments of the present disclosure.

FIGS. 6-8 illustrate various mechanisms for generating waveform-based URSs (e.g., the URSs 520 and 550), which may be used in conjunction with the scheme 500 in the networks 100 and 200 for multi-RAT medium sharing.

FIG. 6 illustrates a URS generation scheme 600 for multi-RAT medium sharing according to embodiments of the present disclosure. The scheme 600 may be employed by the BSs 105, 205, and 400 and the UEs 115, 215, and 300. The scheme 600 employs a plurality of waveform sequences 610 to represent medium reservation information. The plurality of waveform sequences 610 may correspond to instances or repetitions of a short-period waveform sequence, shown as S1, which may be a wideband signal or a narrowband signal spanning a duration 602. In some embodiments, the duration 602 may be about 0.8 μs.

As an example, reservation information for a TXOP (e.g., the TXOP 502) may be represented by Q number of information bits, denoted as $I_0, I_1, \ldots, I_{Q-1}$ and the Q number of bits can be encoded into L number of coded bits, denoted as $d_0, d_1, \ldots, d_{L-1}$, where both Q and L are a positive integer. In some embodiments, Q is equal to L and Q number of information bits are identical to L number of coded bits. In some other embodiments, L>Q and Q number of bits is encoded into L number of coded bits. In some embodiments, Q is less than or equal to 8. The Q number of bits can support N number of reservation information hypotheses 620, denoted as H(1) to H(N), where $N=2^Q$. For example, each hypothesis 620 may indicate a duration of a TXOP reservation, the type of RAT (e.g., NR-based technology or WiFi-based technology) reserving the TXOP, and/or any suitable information for medium sharing across multiple RATs. The duration may be defined in some units of time, for example, in units of 1 ms. In an embodiment, a subset of the hypotheses 620 may be used to indicate TXOP reservations from an NR-based node with a TXOP duration in steps of 1 ms, while another subset of the hypotheses 620 may be used to indicate TXOP reservations from a WiFi-based node with a TXOP duration in steps of 1 ms. In an embodiment, a TXOP reservation may be a semi-static reservation. For example, a node may indicate a periodic TXOP reservation with a duration of 1 ms repeating at every 100 ms.

The scheme 600 includes a hypothesis selection component 630, a mask generation component 640, and a masking component 650. The hypothesis selection component 630 is configured to select a hypothesis $620_{H(k)}$ from the hypotheses $620_{H(1)}$ to $620_{H(N)}$ to indicate particular medium reservation information, where 1≤K≤N. The mask generation component 640 is configured to generate a code or a mask 642 based on the Q information bits or the L coded bits of the selected hypothesis $620_{H(k)}$. The generation may be based on a spreading code, a Walsh code, a differential code, or any suitable code.

In an embodiment, the mask generation component 640 may employ differential encoding to generate the mask 642. The mask generation component 640 encodes a difference between adjacent medium reservation information bits (e.g., $d_1$ and $d_2$). For example, the mask generation component 640 may output a value of +1 when there is a bit change between a pair of adjacent medium reservation information bits and may output a value of −1 when there is no bit change between a pair of adjacent medium reservation information bits. Thus, the mask 642 may include L values, denoted as $d_0$ to with values of +1 and/or −1.

The masking component 650 is configured to apply the mask 642 to the plurality of waveform sequences 610 to produce a URS 660 (e.g., the URSs 520 and 550) including a plurality of waveform sequences 662. For example, the scheme 600 may apply the mask 642 of length L (e.g., L values) to L number of short-period waveform sequences 610 to represent Q medium reservation information bits. The masking component 650 may multiply the L short-period waveform sequences 610 by the mask 642. Each short-period waveform sequence 610 is multiplied by one of the L mask bits, for example, represented by S1×$d_i$, where 0≤i≤L−1. Thus, each waveform sequence 662 corresponds to a waveform sequence 610 masked by a corresponding mask bit $d_i$.

The use of a repeating waveform sequence 610 for the URS 660 allows a receiver to use autocorrelation-based detection. For example, a receiver may apply autocorrelation to a received signal to determine the presence or the beginning of a URS 660. When the mask 642 includes values of +1 and −1, the receiver may apply autocorrelation to detect a phase change between adjacent blocks of samples for detecting the coded bits (e.g., as $d_0, d_1, \ldots, d_{L-1}$) and recovering the original transmitted reservation information bits (e.g., as $I_0, I_1, \ldots, I_{Q-1}$). In some embodiment, the receiving RAT may have a different sampling rate than the transmitting RAT. In such embodiments, the receiver may adjust the sample between sample blocks for the autocorrelation, as described in greater detail herein.

FIG. 7 illustrates a URS generation scheme 700 for multi-RAT medium sharing according to embodiments of the present disclosure. The scheme 700 may be employed by the BSs 105, 205, and 400 and the UEs 115, 215, and 300. The scheme 700 is substantially similar to the scheme 600. However, the scheme 700 employs a plurality of waveform sequences 710 in addition to the plurality of waveform sequences 610 to provide a receiver with training information. The plurality of waveform sequences 710 may correspond to instances or repetitions of a short-period waveform sequence, shown as S2, spanning a duration 702.

In some embodiments, the waveform sequence 710 may be the same as the waveform sequence 610, for example, S2=S1. In some embodiments, the waveform sequence 710 and the waveform sequence 610 may have opposite phases, for example, S2=−1×S1. In some embodiments, the waveform sequences 710 and the waveform sequence 610 may have different waveforms. In some embodiments, the durations 702 and 602 may be the same, for example, about 0.8 µs. In some embodiments, the durations 702 and 602 may be different.

As shown, the masking component 650 applies the mask 642 to the waveform sequences 610 to form a portion 764 of a URS 760 (e.g., the URSs 520 and 550) carrying the medium reservation information. The waveform sequences 710 form a portion 762 at the beginning of the URS 760. The waveform sequences 710 may provide training information for the reception of the URS 760. For example, a receiver may perform time synchronization, frequency synchronization, automatic gain control, and/or packet detection based on the waveform sequences 710. The portion 762 may be referred to as an STF. In an embodiment, the portion 762 may include about 10 waveform sequences 710 and the duration 702 may be about 0.8 µs. Thus, the portion 762 may have a duration of about 8 µs.

Similar to the scheme 600, the use of a repeating waveform sequence 710 and a repeating waveform sequence 610 for the URS 760 allows a receiver to use autocorrelation-based detection. For example, a receiver may apply autocorrelation to a received signal to determine the presence or the beginning of a URS 760. When the mask 642 includes values of +1 and/or −1, the receiver may apply autocorrelation to detect a phase change between adjacent blocks of samples for detecting the coded bits (e.g., as $d_0, d_1, \ldots, d_{L-1}$) and recovering the original transmitted reservation information bits (e.g., as $I_0, I_1, \ldots, I_{Q-1}$). In addition, the receiver may adjust the sample spacing between sample blocks for the autocorrelation, as described in greater detail herein.

FIG. 8 illustrates a URS generation scheme 800 for multi-RAT medium sharing according to embodiments of the present disclosure. The scheme 800 may be employed by the BSs 105, 205, and 400 and the UEs 115, 215, and 300. The scheme 800 is substantially similar to the schemes 600. However, the scheme 800 employs different sets 812 of waveform sequences 810, denoted as S(1) to S(M), to indicate different subsets 622 of hypotheses 620 in addition to different masks 642. Each set 812 includes instances or repetitions of a different waveform sequence 810. For example, the scheme 800 may employ the set $812_{S(1)}$ to carry medium reservation information for a subset $622_{SS(1)}$ of the hypotheses 620 and employ the set $812_{S(M)}$ to carry medium reservation information for a subset $622_{SS(M)}$ of the hypotheses 620. Each waveform sequence 810 may have a fixed duration 802.

The scheme 800 includes a waveform selection component 830. The waveform selection component 830 is configured to select a set $812_{S(P)}$ from the sets $812_{S(1)}$ to $812_{S(M)}$ based on the selected hypothesis $620_{H(k)}$, where $1 \leq P \leq M$. Similar to the scheme 600, the mask generation component 640 generates a mask 642 based on the selected hypothesis $620_{H(k)}$. The masking component 650 applies the mask 642 to the selected set $812_{S(P)}$ of waveform sequences $810_{S(P)}$ to produce a URS 860 (e.g., the URSs 520 and 550). Similar to the URS 660, the URS 860 includes a plurality of waveform sequences 862, each corresponding to a waveform sequence 610 masked by a corresponding mask bit $d_1$.

Similar to the scheme 600, the use of a repeating waveform sequence 810 for the URS 860 allows a receiver to use autocorrelation-based and cross-correlation-based detection. For example, a receiver may apply autocorrelation to a received signal to determine the presence or the beginning of a URS 860. After time-aligning to the URS 860, the receiver may compute cross-correlations between the received signal and the different waveform sequences $810_{S(1)}$ to $810_{S(M)}$ to determine the waveform sequences in the URS 860, and thus the corresponding hypothesis subset 622. When the mask 642 includes values of +1 and −1, the receiver may apply autocorrelation to detect a phase change between adjacent blocks of received samples for detecting the coded bits (e.g., as $d_0, d_1, \ldots, d_{L-1}$) and recovering the original transmitted reservation information bits (e.g., as $I_0, I_1, \ldots, I_{Q-1}$). In addition, the receiver may adjust the spacing between blocks of received samples for the autocorrelation and/or the cross-correlation, as described in greater detail herein.

In some embodiments, the scheme 800 may be used in conjunction with the scheme 700. For example, the URS 860 may include an STF (e.g., the portion 762) at the beginning of the URS 860 to provide training information for the reception of the URS 860. While the schemes 600, 700, and 800 use different masks over a repeating waveform sequence or different masks over different repeating waveform sequence to represent different medium reservation information, similar mechanism can be applied to represent different medium reservation information using different repeating sequences. In addition, a mask can be applied over multiple short periods to represent 1 bit of information for each hypothesis or multiple bits of information for multiple hypotheses.

Figure 9:
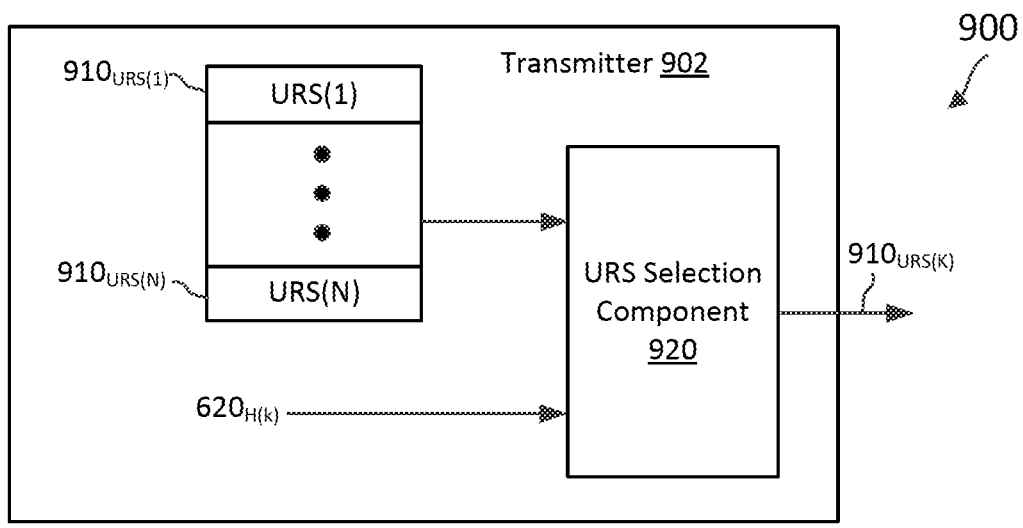
FIG. 9 illustrates a URS transmission scheme for multi-RAT medium sharing according to embodiments of the present disclosure.

FIG. 9 illustrates a URS transmission scheme 900 for multi-RAT medium sharing according to embodiments of the present disclosure. The scheme 900 may be employed by the BSs 105, 205, and 400 and the UEs 115, 215, and 300 to transmit URSs 910 (e.g., the URSs 520, 550, 660, 760, and 860). As described above, a transmitter may transmit URSs based on the numerology (e.g., a sampling rate) of a serving cell of the transmitter. In the scheme 900, a transmitter 902 may store a set of URSs 910, denoted as $URS_1$ to $URS_N$, for example, in a memory (e.g., the memory 304 and 404) of the transmitter 902.

The URSs 910 may be generated using the schemes 600, 700, and/or 800 based on a sampling rate of the serving cell. For example, an NR-based node may store the URSs 910 based on an NR sampling rate and a WiFi-based node may store the URSs 910 based on a WiFi sampling rate. Each URS 910 represents particular reservation information (e.g., a hypothesis 620). For example, the URSs 910 may correspond to the URSs 660, 760, or 860 generated for the hypotheses 620 (e.g., H(1) to H(N)) using the schemes 600, 700, or 800, respectively. The transmitter 902 may include a URS selection component 920 configured to select a URS $910_{URS(k)}$ from the URSs $910_{URS(1)}$ to $910_{URS(N)}$ based on a selected hypothesis $620_{H(k)}$. The transmitter 902 may transmit the selected URS $910_{URS(k)}$ in a spectrum (e.g., the spectrum 501) to reserve a TXOP (e.g., the TXOP 502).

Figure 10:
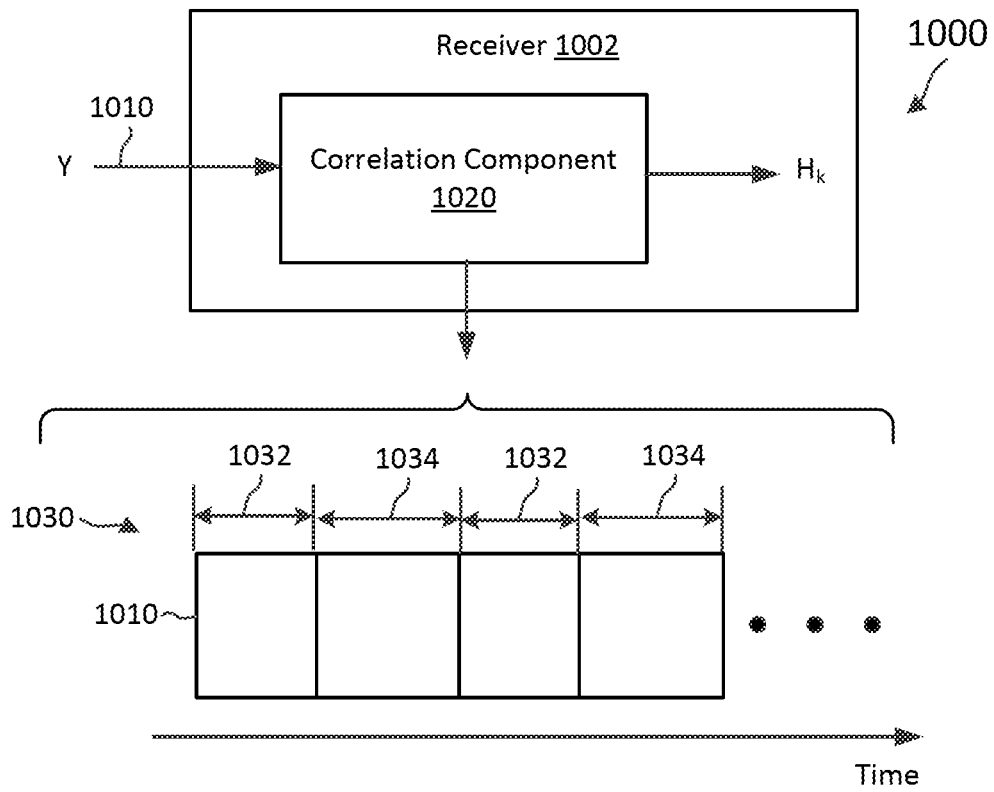
FIG. 10 illustrates a URS detection scheme for multi-RAT medium sharing according to embodiments of the present disclosure.

FIG. 10 illustrates a URS detection scheme 1000 for multi-RAT medium sharing according to embodiments of the present disclosure. In FIG. 10, the x-axis represents time in some constant units. The scheme 1000 may be employed by the BSs 105, 205, and 400 and the UEs 115, 215, and 300 to detect a URS (e.g., the URSs 520, 550, 660, 760, 860, and 910) and determine a hypothesis (e.g., the hypotheses 620) from the URS. In the scheme 1000, a receiver 1002 may receive a signal 1010, denoted as Y, from a channel (e.g., the spectrum 501). The receiver 1002 may include a correlation component 1020 configured to perform autocorrelation and/or cross-correlation. For example, the correlation component 1020 may perform autocorrelation between two blocks of samples of the signal 1010.

As described above, different RATs may use different sampling rates, which may or not be integer multiple of each other. For example, NR may use a subcarrier spacing that is an integer multiple of 15 kilohertz (kHz), while WiFi may use 802.11ax subcarrier spacing that is an integer multiple of 78.125 kHz. Thus, the NR sampling frequency may not be an integer multiple of the WiFi sampling frequency. The correlation component 1020 may account for the different sampling rates when detecting a signal 1010 transmitted by a RAT (e.g., NR) different from a RAT (e.g., WiFi) of a serving cell of the receiver 1002. The correlation component 1020 may apply time dithering to select blocks of samples from the signal 1010 for correlation instead of resampling the received signal 1010 to the sampling rate of the transmitting RAT.

As shown in the timing diagram 1030, the correlation component 1020 may select a block 1032 of samples and a block 1034 of samples from the received signal 1010. The block 1032 may include X number of samples, where X is a positive integer. The 1034 may include (X+1) number of samples. The value X may be determined based on the sampling rate of the RAT used by the serving cell and the sampling rate of the transmitting RAT. For example, a duration (e.g., the durations 602, 702, and 802) of a waveform sequence (e.g., the waveform sequences 610, 710, 712, and 810) may include 100 samples based on the numerology of the transmitting RAT, but may include 91.5 samples based on the numerology of the receiving RAT. Thus, the receiver 1002 may configured X to be a value of 91.

The correlation component 1020 may compute a correlation between the X samples in the block 1032 and X samples in the block 1034, for example, by dropping the last sample or the first sample in the block 1034. In other words, the correlation component 1020 may adjust the spacing between blocks of samples for correlations, for example, by skipping or dropping one sample in alternate blocks. The rate of dropping or skipping a sample may be dependent on the sampling rates of the transmitting RAT and the receiving RAT. For example, the correlation component 1020 may drop one sample in every 2, 3, 4, or 5 blocks. The correlation component 1020 may apply similar sample dithering for computing cross-correlations, for example, when the received signal 1010 includes a URS 860 generated from the scheme 800. In some embodiments, the correlation component 1020 may perform coherent combining on correlation results by considering phase differences between the blocks 1032 and 1034 due to the sample drop. In some embodiments, the receiver 1002 may perform additional interpolation to further improve URS detection performance.

Figure 11:
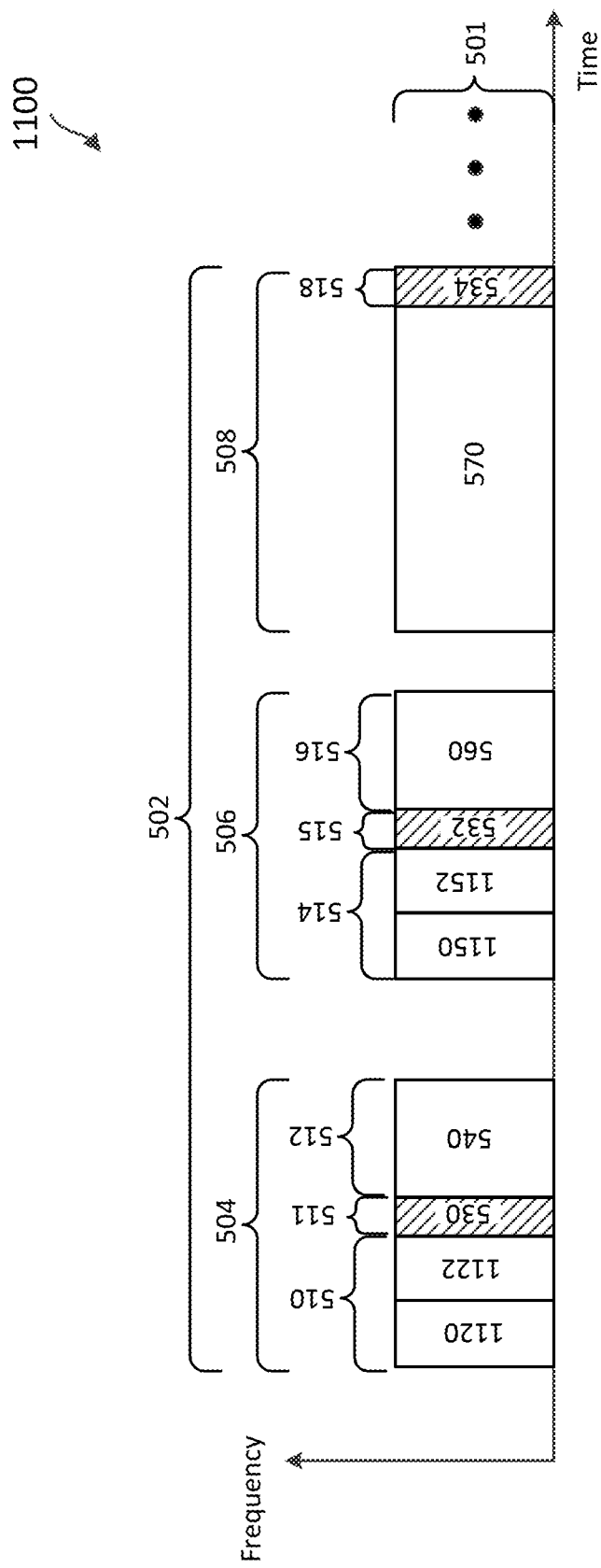
FIG. 11 illustrates a multi-RAT medium sharing scheme according to embodiments of the present disclosure.

FIG. 11 illustrates a multi-RAT medium sharing scheme 1100 according to embodiments of the present disclosure. The x-axis represents time in some constant units. The y-axis represents frequency in some constant units. The scheme 1100 may be employed by nodes of different RATs, such as the BSs 105, 205, and 400 and the UEs 115, 215, and 300, to communicate over a shared spectrum 501. The scheme 1100 is substantially similar to the scheme 500, but a transmitter may transmit multiple copies of a URS based on different RATs with different numerologies. For example, a transmitter may transmit a URS 1120 and a URS 1122 in the common period 510 of the RRS period 508. The URSs 1120 and 1122 may be similar to the URSs 520, 550, 660, 760, 860, and 910. The URS 1120 and the URS 1122 may carry the same medium reservation information (e.g., the hypotheses 620), but configured based on two different RATs.

As an example, the spectrum 501 is shared between an NR-based network and a WiFi-based network. The URS 1120 may be configured based on an NR numerology and the URS 1122 may be configured based on a WiFi numerology. For example, the URSs 1120 and 1122 may be generated using the scheme 600. Thus, the URS 1120 may correspond to the URS 660 sampled at an NR sampling rate and the URS 1120 may correspond to the URS 660 sampled at a WiFi sampling rate.

Similarly, a target receiver may respond to the URSs 1120 and 1122 by transmitting a URS 1150 and a URS 1152 in the common period 514 of the RRS period 508. The URSs 1150 and 1152 may carry the same medium reservation information, but configured based on numerologies of different RATs. While the scheme 1100 is illustrated with URSs configured for two different RATs, the scheme 1100 may be applied to a network supporting any suitable number of RATs. For example, when a network supports three different RATs, the scheme 1100 may be scaled to transmit three copies of the same medium reservation information carried in three URSs configured for the three different RATs in the common periods 510 and 514.

The transmissions of multiple copies of reservation information using numerologies of different RATs allow a receiver to perform detection based on the numerology of a serving cell of the receiver. For example, when the URS 1120 is transmitted using NR and the URS 1122 is transmitted using WiFi, an NR-based receiver may detect and process the URS 1120 and a WiFi-based receiver may detect and process the URS 1122.

Figure 12:
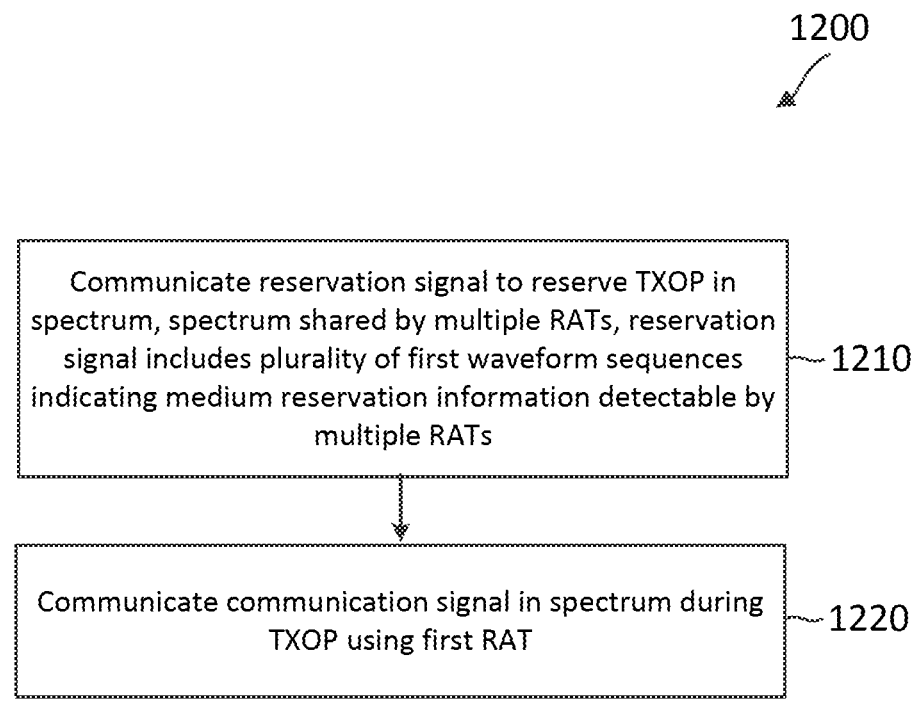
FIG. 12 is a flow diagram of a multi-RAT medium sharing method according to embodiments of the present disclosure.

FIG. 12 is a flow diagram of a multi-RAT medium sharing method 1200 according to embodiments of the present disclosure. Steps of the method 1200 can be executed by a computing device (e.g., a processor, processing circuit, and/or other suitable component) of a wireless communication device, such as the BSs 105, 205, and 400, the UEs 115, 215, and 300, the transmitter 902, and the receiver 1002. The method 1200 may employ similar mechanisms as in the schemes 500, 600, 700, 800, 900, 1000, and 1100 described with respect to FIGS. 5, 6, 7, 8, 9, 10, and 11, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes communicating, by a first wireless communication device with a second wireless communication device, a reservation signal (e.g., the URSs 520, 550, 660, 760, 860, 910, 1120, 1122, 1150, and 1152) to reserve a TXOP (e.g., the TXOP 502) in a spectrum (e.g., the spectrum 501). The spectrum is shared by multiple RATs (e.g., NR and WiFi). The reservation signal includes a set of waveform sequence (e.g., the waveform sequences 610, 662, 710, 810, and 862) indicating medium reservation information (e.g., the hypotheses 620) detectable by the multiple RATs. The first wireless communication device and the second wireless communication device are associated with a first RAT of the multiple RATs.

At step 1220, the method 1200 includes communicating, by the first wireless communication device and the second wireless communication device, a communication signal (e.g., the communication signal 570) in the spectrum during the TXOP using the first RAT.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising communicating, by a first wireless communication device with a second wireless communication device, a reservation signal to reserve a transmission opportunity (TXOP) in a spectrum, wherein the spectrum is shared by multiple radio access technologies (RATs), wherein the reservation signal includes a plurality of first waveform sequences indicating medium reservation information detectable by the multiple RATs, and wherein the first wireless communication device and the second wireless communication device are associated with a first RAT of the multiple RATs; and communicating, by the first wireless communication device with the second wireless communication device using the first RAT, a communication signal in the spectrum during the TXOP.

In some embodiments, wherein the medium reservation information indicates at least one of a reservation duration for the TXOP or a RAT type indicating that the TXOP is reserved by the first RAT. In some embodiments, wherein the plurality of first waveform sequences correspond to multiple instances of a second waveform sequence masked by a code representing the medium reservation information. In some embodiments, wherein the medium reservation information is represented by a phase difference between adjacent first waveform sequences of the plurality of first waveform sequences. In some embodiments, wherein the reservation signal includes a plurality of second waveform sequences providing information for reception of the reservation signal. In some embodiments, wherein the communicating the reservation signal includes transmitting, by the first wireless communication device to the second wireless communication device, the reservation signal, and wherein the method further comprises selecting, by the first wireless communication device, the plurality of first waveform sequences from a plurality of second waveform sequences based on the medium reservation information. In some embodiments, wherein the communicating the reservation signal includes receiving, by the first wireless communication device from the second wireless communication device, the reservation signal, and wherein the method further comprises identifying, by the first wireless communication device, the plurality of first waveform sequences based on a detection between the reservation signal and a plurality of second waveform sequences. In some embodiments, wherein the communicating the reservation signal includes transmitting, by the first wireless communication device, the reservation signal based on a numerology of the first RAT. In some embodiments, wherein the communicating the reservation signal includes transmitting, by the first wireless communication device based on a numerology of the first RAT, a first signal indicating the medium reservation information; and transmitting, by the first wireless communication device based on a numerology of a second RAT of the multiple RATs, a second signal indicating the medium reservation information. In some embodiments, the method further comprises receiving, by the first wireless communication device from a third wireless communication device, a reservation signal for another TXOP in the spectrum, the third wireless communication device associated with a second RAT of the multiple RATs; determining, by the first wireless communication device, medium reservation information associated with the second RAT from the reservation signal for the another TXOP; and refraining, by the first wireless communication device, from communicating in the spectrum during the another TXOP based on the medium reservation information associated with the second RAT. In some embodiments, wherein the reservation signal for the another TXOP is transmitted using a numerology of the first RAT. In some embodiments, wherein the reservation signal for the another TXOP is transmitted using a numerology of the second RAT. In some embodiments, wherein the receiving the reservation signal for the another TXOP includes performing, by the first wireless communication device, correlations based on samples of the reservation signal spaced apart by a first spacing associated with a numerology of the first RAT; and performing, by the first wireless communication device, correlations based on samples of the reservation signal spaced apart by a second spacing associated with a numerology of the second RAT. In some embodiments, the method further comprises communicating, by the first wireless communication device with the second wireless communication device, a filler signal in the spectrum during the TXOP based on a symbol boundary of the first RAT. In some embodiments, the method further comprises communicating, by the first wireless communication device with the second wireless communication device, a filler signal in the spectrum during the TXOP based on a duration of the TXOP. In some embodiments, the method further comprises communicating, by the first wireless communication device with the second wireless communication device, a first RAT-specific reservation signal including at least one of a preamble of the first RAT or scheduling information of the first RAT.

Further embodiments of the present disclosure include an apparatus comprising a transceiver configured to communicate, with a second wireless communication device, a reservation signal to reserve a transmission opportunity (TXOP) in a spectrum, wherein the spectrum is shared by multiple radio access technologies (RATs), wherein the reservation signal includes a plurality of first waveform sequences indicating medium reservation information detectable by the multiple RATs, and wherein the apparatus and the second wireless communication device are associated with a first RAT of the multiple RATs; and communicate, with the second wireless communication device using the first RAT, a communication signal in the spectrum during the TXOP.

In some embodiments, wherein the medium reservation information indicates at least one of a reservation duration for the TXOP or a RAT type indicating that the TXOP is reserved by the first RAT. In some embodiments, wherein the plurality of first waveform sequences correspond to multiple instances of a second waveform sequence masked by a code representing the medium reservation information. In some embodiments, wherein the medium reservation information is represented by a phase difference between adjacent first waveform sequences of the plurality of first waveform sequences. In some embodiments, wherein the reservation signal includes a plurality of second waveform sequences providing information for reception of the reservation signal. In some embodiments, wherein the transceiver is further configured to communicate the reservation signal by transmitting, to the second wireless communication device, the reservation signal, and wherein the apparatus further comprises a processor configured to select the plurality of first waveform sequences from a plurality of second waveform sequences based on the medium reservation information. In some embodiments, wherein the transceiver is further configured to communicate the reservation signal by receiving, from the second wireless communication device, the reservation signal, and wherein the apparatus further comprises a processor configured to identify the plurality of first waveform sequences based on a detection between the reservation signal and a plurality of second waveform sequences. In some embodiments, wherein the transceiver is further configured to communicate the reservation signal by transmitting the reservation signal based on a numerology of the first RAT. In some embodiments, wherein the transceiver is further configured to communicating the reservation signal by transmitting, based on a numerology of the first RAT, a first signal indicating the medium reservation information; and transmitting, based on a numerology of a second RAT of the multiple RATs, a second signal indicating the medium reservation information. In some embodiments, wherein the transceiver is further configured to receive, from a third wireless communication device, a reservation signal for another TXOP in the spectrum, the third wireless communication device associated with a second RAT of the multiple RATs, and wherein the apparatus further comprises a processor configured to determine medium reservation information associated with the second RAT from the reservation signal for the another TXOP; and refrain from communicating in the spectrum during the another TXOP based on the medium reservation information associated with the second RAT. In some embodiments, wherein the reservation signal for the another TXOP is transmitted using a numerology of the first RAT. In some embodiments, wherein the reservation signal for the another TXOP is transmitted using a numerology of the second RAT. In some embodiments, the apparatus further comprises a processor configured to perform correlations based on samples of the reservation signal for the another TXOP spaced apart by a first spacing associated with a numerology of the first RAT; and perform correlations based on samples of the reservation signal for the another TXOP spaced apart by a second spacing associated with a numerology of the second RAT. In some embodiments, wherein the transceiver is further to communicate, with the second wireless communication device, a filler signal in the spectrum during the TXOP based on a symbol boundary of the first RAT. In some embodiments, wherein the transceiver is further to communicate, with the second wireless communication device, a filler signal in the spectrum during the TXOP based on a duration of the TXOP. In some embodiments, wherein the transceiver is further to communicate, with the second wireless communication device, a first RAT-specific reservation signal including at least one of a preamble of the first RAT or scheduling information of the first RAT.

Further embodiments of the present disclosure include a computer-readable medium having program code recorded thereon, the program code comprising code for causing a first wireless communication device to communicate, with a second wireless communication device, a reservation signal to reserve a transmission opportunity (TXOP) in a spectrum, wherein the spectrum is shared by multiple radio access technologies (RATs), wherein the reservation signal includes a plurality of first waveform sequences indicating medium reservation information detectable by the multiple RATs, and wherein the first wireless communication device and the second wireless communication device are associated with a first RAT of the multiple RATs; and code for causing the first wireless communication device to communicating, by the first wireless communication device with the second wireless communication device using the first RAT, a communication signal in the spectrum during the TXOP.

In some embodiments, wherein the medium reservation information indicates at least one of a reservation duration for the TXOP or a RAT type indicating that the TXOP is reserved by the first RAT. In some embodiments, wherein the plurality of first waveform sequences correspond to multiple instances of a second waveform sequence masked by a code representing the medium reservation information. In some embodiments, wherein the medium reservation information is represented by a phase difference between adjacent first waveform sequences of the plurality of first waveform sequences. In some embodiments, wherein the reservation signal includes a plurality of second waveform sequences providing information for reception of the reservation signal. In some embodiments, wherein the code for causing the first wireless communication device to communicate the reservation signal is further configured to transmit, to the second wireless communication device, the reservation signal, and wherein the computer-readable medium further comprises code for causing the first wireless communication device to select the plurality of first waveform sequences from a plurality of second waveform sequences based on the medium reservation information. In some embodiments, wherein the code for causing the first wireless communication device to communicate the reservation signal is further configured to receive, from the second wireless communication device, the reservation signal, and wherein the computer-readable medium further comprises code for causing the first wireless communication device to identify the plurality of first waveform sequences based on a detection between the reservation signal and a plurality of second waveform sequences. In some embodiments, wherein the code for causing the first wireless communication device to communicate the reservation signal is further configured to transmit the reservation signal based on a numerology of the first RAT. In some embodiments, wherein the code for causing the first wireless communication device to communicate the reservation signal is further configured to transmit, based on a numerology of the first RAT, a first signal indicating the medium reservation information; and transmit, based on a numerology of a second RAT of the multiple RATs, a second signal indicating the medium reservation information. In some embodiments, the computer-readable medium further comprises code for causing the first wireless communication device to receive, from a third wireless communication device, a reservation signal for another TXOP in the spectrum, the third wireless communication device associated with a second RAT of the multiple RATs; code for causing the first wireless communication device to determine medium reservation information associated with the second RAT from the reservation signal for the another TXOP; and code for causing the first wireless communication device to refrain from communicating in the spectrum during the another TXOP based on the medium reservation information associated with the second RAT. In some embodiments, wherein the reservation signal for the another TXOP is transmitted using a numerology of the first RAT. In some embodiments, wherein the reservation signal for the another TXOP is transmitted using a numerology of the second RAT. In some embodiments, wherein the code for causing the first wireless communication device to receive the reservation signal for the another TXOP is further configured to perform correlations based on samples of the reservation signal spaced apart by a first spacing associated with a numerology of the first RAT; and perform correlations based on samples of the reservation signal spaced apart by a second spacing associated with a numerology of the second RAT. In some embodiments, the computer-readable medium further comprises code for causing the first wireless communication device to communicate, with the second wireless communication device, a filler signal in the spectrum during the TXOP based on a symbol boundary of the first RAT. In some embodiments, the computer-readable medium further comprises code for causing the first wireless communication device to communicate, with the second wireless communication device, a filler signal in the spectrum during the TXOP based on a duration of the TXOP. In some embodiments, the computer-readable medium further comprises code for causing the first wireless communication device to communicate, with the second wireless communication device, a first RAT-specific reservation signal including at least one of a preamble of the first RAT or scheduling information of the first RAT.

Further embodiments of the present disclosure include an apparatus comprising means for communicating, with a second wireless communication device, a reservation signal to reserve a transmission opportunity (TXOP) in a spectrum, wherein the spectrum is shared by multiple radio access technologies (RATs), wherein the reservation signal includes a plurality of first waveform sequences indicating medium reservation information detectable by the multiple RATs, and wherein the apparatus and the second wireless communication device are associated with a first RAT of the multiple RATs; and means for communicating, with the second wireless communication device using the first RAT, a communication signal in the spectrum during the TXOP.

In some embodiments, wherein the medium reservation information indicates at least one of a reservation duration for the TXOP or a RAT type indicating that the TXOP is reserved by the first RAT. In some embodiments, wherein the plurality of first waveform sequences correspond to multiple instances of a second waveform sequence masked by a code representing the medium reservation information. In some embodiments, wherein the medium reservation information is represented by a phase difference between adjacent first waveform sequences of the plurality of first waveform sequences. In some embodiments, wherein the reservation signal includes a plurality of second waveform sequences providing information for reception of the reservation signal. In some embodiments, wherein the means for communicating the reservation signal is further configured to transmit, to the second wireless communication device, the reservation signal, and wherein the apparatus further comprises means for selecting the plurality of first waveform sequences from a plurality of second waveform sequences based on the medium reservation information. In some embodiments, wherein the means for communicating the reservation signal is further configured to receive, from the second wireless communication device, the reservation signal, and wherein the apparatus further comprises means for identifying the plurality of first waveform sequences based on a detection between the reservation signal and a plurality of second waveform sequences. In some embodiments, wherein the means for communicating the reservation signal is further configured to transmit the reservation signal based on a numerology of the first RAT. In some embodiments, wherein the means for communicating the reservation signal is further configured to transmit, based on a numerology of the first RAT, a first signal indicating the medium reservation information; and transmit, based on a numerology of a second RAT of the multiple RATs, a second signal indicating the medium reservation information. In some embodiments, the apparatus further comprises means for receiving, from a third wireless communication device, a reservation signal for another TXOP in the spectrum, the third wireless communication device associated with a second RAT of the multiple RATs; means for determining medium reservation information associated with the second RAT from the reservation signal for the another TXOP; and means for refraining from communicating in the spectrum during the another TXOP based on the medium reservation information associated with the second RAT. In some embodiments, wherein the reservation signal for the another TXOP is transmitted using a numerology of the first RAT. In some embodiments, wherein the reservation signal for the another TXOP is transmitted using a numerology of the second RAT. In some embodiments, wherein the means for receiving the reservation signal for the another TXOP is further configured to perform correlations based on samples of the reservation signal spaced apart by a first spacing associated with a numerology of the first RAT; and perform correlations based on samples of the reservation signal spaced apart by a second spacing associated with a numerology of the second RAT. In some embodiments, the apparatus further comprises means for communicating, with the second wireless communication device, a filler signal in the spectrum during the TXOP based on a symbol boundary of the first RAT. In some embodiments, the apparatus further comprises means for communicating, with the second wireless communication device, a filler signal in the spectrum during the TXOP based on a duration of the TXOP. In some embodiments, the apparatus further comprises means for communicating, with the second wireless communication device, a first RAT-specific reservation signal including at least one of a preamble of the first RAT or scheduling information of the first RAT.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
communicating, by a first wireless communication device with a second wireless communication device, a reservation signal to reserve a transmission opportunity (TXOP) in a spectrum, wherein the spectrum is shared by multiple radio access technologies (RATs), wherein the reservation signal includes a first waveform sequence of a plurality of waveform sequences, each waveform sequence of the plurality of waveform sequences representing different medium reservation information identifiable by the multiple RATs, the first waveform sequence including a concatenation of repetitions of a second waveform sequence in consecutive time periods, wherein a phase change between each pair of adjacent second waveform sequences in adjacent time periods represents first medium reservation information, and wherein the first wireless communication device and the second wireless communication device are associated with a first RAT of the multiple RATs; and
communicating, by the first wireless communication device with the second wireless communication device using the first RAT, a communication signal in the spectrum during the TXOP.

2. The method of claim 1, wherein the first medium reservation information further includes at least one of a reservation duration for the TXOP or a RAT type indicating that the TXOP is reserved by the first RAT.

3. The method of claim 1, wherein the repetitions of the second waveform sequence are masked by a code representing the first medium reservation information.

4. The method of claim 1, wherein the reservation signal includes a plurality of third waveform sequences providing information for reception of the reservation signal.

5. The method of claim 1, wherein the communicating the reservation signal includes transmitting, by the first wireless communication device to the second wireless communication device, the reservation signal, and wherein the method further comprises selecting, by the first wireless communication device, the first waveform sequence from the plurality of waveform sequences to represent the first medium reservation information.

6. The method of claim 1, wherein the communicating the reservation signal includes receiving, by the first wireless communication device from the second wireless communication device, the reservation signal, and wherein the method further comprises identifying, by the first wireless communication device, the first waveform sequence based on a detection between the reservation signal and the plurality of waveform sequences.

7. The method of claim 1, wherein the communicating the reservation signal includes transmitting, by the first wireless communication device, the reservation signal based on a numerology of the first RAT.

8. The method of claim 1, wherein the communicating the reservation signal includes:

transmitting, by the first wireless communication device based on a numerology of the first RAT, a first signal indicating the first medium reservation information; and
transmitting, by the first wireless communication device based on a numerology of a second RAT of the multiple RATs, a second signal indicating the first medium reservation information.

9. The method of claim 1, further comprising:
receiving, by the first wireless communication device from a third wireless communication device, a reservation signal for another TXOP in the spectrum, the third wireless communication device associated with a second RAT of the multiple RATs;
determining, by the first wireless communication device, medium reservation information associated with the second RAT from the reservation signal for the another TXOP; and
refraining, by the first wireless communication device, from communicating in the spectrum during the another TXOP based on the medium reservation information associated with the second RAT, wherein the reservation signal for the another TXOP is transmitted using at least one of a numerology of the first RAT or the second RAT.

10. The method of claim 1, further comprising:
receiving, by the first wireless communication device from a third wireless communication device of the first RAT, a reservation signal for another TXOP in the spectrum;
determining, by the first wireless communication device, that the reservation signal for the another TXOP is transmitted by another wireless communication device of the first RAT; and
monitoring, by the first wireless communication device, for a first RAT-specific reservation signal in response to the determining.

11. The method of claim 1, further comprising communicating, by the first wireless communication device with the second wireless communication device, a filler signal in the spectrum during the TXOP based on at least one of a symbol boundary of the first RAT or a duration of the TXOP.

12. An apparatus comprising:
a transceiver configured to:
communicate, with a second wireless communication device, a reservation signal to reserve a transmission opportunity (TXOP) in a spectrum, wherein the spectrum is shared by multiple radio access technologies (RATs), wherein the reservation signal includes a first waveform sequence of a plurality of waveform sequences, each waveform sequence of the plurality of waveform sequences representing different medium reservation information identifiable by the multiple RATs, the first waveform sequence including a concatenation of repetitions of a second waveform sequence in consecutive time periods, wherein a phase change between each pair of adjacent second waveform sequences in adjacent time periods represents first medium reservation information, and wherein the apparatus and the second wireless communication device are associated with a first RAT of the multiple RATs; and
communicate, with the second wireless communication device using the first RAT, a communication signal in the spectrum during the TXOP.

13. The apparatus of claim 12, wherein the first medium reservation information further includes at least one of a reservation duration for the TXOP or a RAT type indicating that the TXOP is reserved by the first RAT.

14. The apparatus of claim 12, wherein the repetitions of the second waveform sequence are masked by a code representing the first medium reservation information.

15. The apparatus of claim 12, wherein the transceiver is further configured to communicate the reservation signal by transmitting, to the second wireless communication device, the reservation signal, and wherein the apparatus further comprises a processor configured to select the first waveform sequence from the plurality of waveform sequences to represent the first medium reservation information.

16. The apparatus of claim 12, wherein the transceiver is further configured to communicate the reservation signal by receiving, from the second wireless communication device, the reservation signal, and wherein the apparatus further comprises a processor configured to identify the first waveform sequence based on a detection between the reservation signal and the plurality of waveform sequences.

17. The apparatus of claim 12, wherein the transceiver is further configured to communicate the reservation signal by transmitting the reservation signal based on a numerology of the first RAT.

18. The apparatus of claim 12, wherein the transceiver is further configured to communicating the reservation signal by:
 transmitting, based on a numerology of the first RAT, a first signal indicating the first medium reservation information; and
 transmitting, based on a numerology of a second RAT of the multiple RATs, a second signal indicating the first medium reservation information.

19. The apparatus of claim 12, wherein the transceiver is further to communicate, with the second wireless communication device, a filler signal in the spectrum during the TXOP based on at least one of a symbol boundary of the first RAT or a duration of the TXOP.

20. A non-transitory computer-readable medium having program code recorded thereon, the program code comprising:
 code for causing a first wireless communication device to communicate, with a second wireless communication device, a reservation signal to reserve a transmission opportunity (TXOP) in a spectrum, wherein the spectrum is shared by multiple radio access technologies (RATs), wherein the reservation signal includes a first waveform sequence of a plurality of waveform sequences, each waveform sequence of the plurality of waveform sequences representing different medium reservation information identifiable by the multiple RATs, the first waveform sequence including a concatenation of repetitions of a second waveform sequence in consecutive time periods, wherein a phase change between each pair of adjacent second waveform sequences in adjacent time periods represents first medium reservation information, and wherein the first wireless communication device and the second wireless communication device are associated with a first RAT of the multiple RATs; and
 code for causing the first wireless communication device to communicating, by the first wireless communication device with the second wireless communication device using the first RAT, a communication signal in the spectrum during the TXOP.

21. The non-transitory computer-readable medium of claim 20, wherein the first medium reservation information includes at least one of a reservation duration for the TXOP or a RAT type indicating that the TXOP is reserved by the first RAT.

22. The non-transitory computer-readable medium of claim 20, wherein the repetitions of the second waveform sequence are masked by a code representing the first medium reservation information.

23. The non-transitory computer-readable medium of claim 20, wherein the code for causing the first wireless communication device to communicate the reservation signal is further configured to transmit, to the second wireless communication device, the reservation signal, and wherein the program code further comprises code for causing the first wireless communication device to select the first waveform sequence from the plurality of waveform sequences to represent the first medium reservation information.

24. The non-transitory computer-readable medium of claim 20, wherein the code for causing the first wireless communication device to communicate the reservation signal is further configured to receive, from the second wireless communication device, the reservation signal, and wherein the program code further comprises code for causing the first wireless communication device to identify the first waveform sequence based on a detection between the reservation signal and the plurality of waveform sequences.

25. The non-transitory computer-readable medium of claim 20, wherein the code for causing the first wireless communication device to communicate the reservation signal is further configured to transmit the reservation signal based on a numerology of the first RAT.

26. The non-transitory computer-readable medium of claim 20, wherein the code for causing the first wireless communication device to communicate the reservation signal is further configured to:
 transmit, based on a numerology of the first RAT, a first signal indicating the first medium reservation information; and
 transmit, based on a numerology of a second RAT of the multiple RATs, a second signal indicating the first medium reservation information.

27. The non-transitory computer-readable medium of claim 20, further comprising code for causing the first wireless communication device to communicate, with the second wireless communication device, a filler signal in the spectrum during the TXOP based on at least one of a symbol boundary of the first RAT or a duration of the TXOP.

* * * * *